(12) United States Patent
Shah et al.

(10) Patent No.: US 8,002,708 B2
(45) Date of Patent: Aug. 23, 2011

(54) ULTRASOUND BEAMFORMER WITH SCALABLE RECEIVER BOARDS

(75) Inventors: Snehal Chandrakant Shah, Milwaukee, WI (US); Steven Charles Miller, Waukesha, WI (US); Michael Richard Moritz, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1991 days.

(21) Appl. No.: 11/033,188

(22) Filed: Jan. 11, 2005

(65) Prior Publication Data

US 2006/0173335 A1    Aug. 3, 2006

(51) Int. Cl.
*A61B 8/00* (2006.01)
(52) U.S. Cl. .................. 600/447; 600/443; 367/123
(58) Field of Classification Search .................. 600/459; 73/584; 310/318–319
See application file for complete search history.

(56) References Cited

U.S. PATENT DOCUMENTS

| | | | |
|---|---|---|---|
| 5,053,947 A | 10/1991 | Heibel et al. | |
| 5,369,624 A | 11/1994 | Fukukita et al. | |
| 5,388,079 A | 2/1995 | Kim et al. | |
| 5,469,851 A | 11/1995 | Lipschutz | |
| 5,544,128 A | 8/1996 | Kim et al. | |
| 5,795,297 A | 8/1998 | Daigle | |
| 5,964,835 A | 10/1999 | Fowler et al. | |
| 5,971,923 A | 10/1999 | Finger | |
| 6,111,816 A | 8/2000 | Chiang et al. | |
| 6,262,749 B1 | 7/2001 | Finger et al. | |
| 6,300,961 B1 | 10/2001 | Finger et al. | |
| 6,358,204 B1 | 3/2002 | Finger et al. | |
| 6,379,304 B1 | 4/2002 | Gilbert et al. | |
| 6,417,857 B2 | 7/2002 | Finger et al. | |
| 6,421,731 B1 | 7/2002 | Ciotti, Jr. et al. | |
| 6,478,593 B2 | 11/2002 | Miwa | |
| 6,491,634 B1 * | 12/2002 | Leavitt et al. ................. 600/447 |
| 6,497,664 B1 | 12/2002 | Randall et al. | |
| 6,524,254 B2 | 2/2003 | Erikson | |
| 6,530,887 B1 | 3/2003 | Gilbert et al. | |
| 6,547,730 B1 | 4/2003 | Lin et al. | |
| 6,556,695 B1 | 4/2003 | Packer et al. | |

(Continued)

OTHER PUBLICATIONS

US Patent Application, Method and Apparatus for Utilizing a High Speed Serial Data Bus Interface Within an Ultrasound System, filed Jul. 14, 2005, U.S. Appl. No. 11/181,343, (17) pages.

(Continued)

*Primary Examiner* — Long V Le
*Assistant Examiner* — Helene Bor
(74) *Attorney, Agent, or Firm* — Dean Small; The Small Patent Law Group (57) ABSTRACT

A beamformer for an ultrasound system and a method for developing a beamformer are provided. The beamformer includes an RF interface configured to be connected to receiver boards that are connected to a probe. The method includes providing receiver boards, wherein each of the receiver boards is capable of conveying a common number of channels per board and has substantially similar circuit components and layouts. The method also includes selecting a number of channels per probe to be conveyed in parallel between a probe and the receiver boards, wherein the channels per probe is an integer multiple of the channels per board. The method further includes determining a combination of the receiver boards to use in the beamformer based on the number of channels per probe, wherein the receiver boards are capable of being used in at least first and second different combinations that support first and second different numbers of channels per probe.

23 Claims, 5 Drawing Sheets

U.S. PATENT DOCUMENTS

| | | |
|---|---|---|
| 6,561,979 B1 | 5/2003 | Wood et al. |
| 6,595,921 B1 | 7/2003 | Urbano et al. |
| 6,629,926 B1 | 10/2003 | Finger et al. |
| 6,666,825 B2 | 12/2003 | Smith et al. |
| 6,669,633 B2 | 12/2003 | Brodsky et al. |
| 6,695,783 B2 | 2/2004 | Henderson et al. |
| 6,701,341 B1 | 3/2004 | Wu et al. |
| 6,716,189 B1 | 4/2004 | Jarvik et al. |
| 6,733,449 B1 | 5/2004 | Krishnamurthy et al. |
| 6,752,763 B2 | 6/2004 | Erikson |
| 6,780,154 B2 | 8/2004 | Hunt et al. |
| 6,783,493 B2 | 8/2004 | Chiang et al. |
| 6,822,374 B1 | 11/2004 | Smith et al. |
| 6,869,401 B2 | 3/2005 | Gilbert et al. |
| 7,058,054 B2 | 6/2006 | Abdollahi et al. |
| 7,297,118 B2 * | 11/2007 | Kristoffersen ................ 600/447 |
| 2001/0035866 A1 | 11/2001 | Finger et al. |
| 2002/0067359 A1 | 6/2002 | Brodsky et al. |
| 2002/0082500 A1 * | 6/2002 | Henderson et al. ........... 600/443 |
| 2002/0120193 A1 | 8/2002 | Chiang et al. |
| 2003/0073894 A1 | 4/2003 | Chiang et al. |
| 2003/0100833 A1 | 5/2003 | He et al. |
| 2003/0103387 A1 | 6/2003 | Bondurant |
| 2003/0176787 A1 | 9/2003 | Gilbert et al. |
| 2004/0015079 A1 | 1/2004 | Berger et al. |
| 2005/0154314 A1 | 7/2005 | Quistgaard |
| 2005/0228287 A1 * | 10/2005 | Little et al. .................... 600/459 |
| 2006/0092930 A1 | 5/2006 | Shah |
| 2006/0173335 A1 | 8/2006 | Shah et al. |

OTHER PUBLICATIONS

US Patent Application, Ultrasound Beamformer With High Speed Serial Control Bus Packetized Protocol, filed Oct. 28, 2004, U.S. Appl. No. 10/975,579, (24) pages.

* cited by examiner

ULTRASOUND BEAMFORMER WITH SCALABLE RECEIVER BOARDS

BACKGROUND OF THE INVENTION

The invention relates generally to various aspects of a beamformer (BF) for an ultrasound system.

Current state-of-the-art beamformers (BFs) use digital custom integrated circuit (CIC) chips to perform the functions of the beamformer associated with the signals transmitted to and received from transducer elements of an ultrasound probe. A CIC chip performs signal processing on a matrix of input signals received from a number of the transducer elements. The transducer elements generate input signals when the transducer elements receive ultrasound echoes from a region of interest in response to an ultrasound scan pulse. The CIC chip combines the matrix of input signals into one or more BF receive beams. Each input signal is also referred to as an input or transducer channel. Conventional CIC chips may handle 64 or 128 or 256 transducer channels on one common chip. The CIC chip uses predetermined sets of delays to form each receive beam from the input signals.

A CIC chip is designed to use a different set of delays with the same set of input channels or input signals to obtain or form multiple receive beams. The multiple receive beams are associated with the ultrasound echoes from focal points along multiple scan lines for a given ultrasound pulse. In this case, the signals received from multiple transducer elements may be processed simultaneously into multiple receive beams, this process being referred to as multi-line acquisition (MLA). The simultaneous collecting and processing of echo information along multiple scan lines within the subject is referred to as multi-line acquisition (MLA). MLA allows multiple beams to be assembled or formed simultaneously. As the number of MLA beams increases, the CIC chip size (e.g. amount of circuitry) also increases. An alternative to increasing the CIC chip size is to reduce the number of receive inputs in the matrix of receive inputs when increasing the number of MLA beams to be processed by the CIC chip.

Conventional BF technology dedicates a given size CIC chip and its associated board to a particular MLA size or capability. For example, a system having MLA4 (e.g. simultaneously producing 4 receive beams or 4 multi-line acquisitions) would use a specially designed MLA4 CIC chip and specially designed boards for the MLA4 CIC chips. In order to upgrade an ultrasound system from MLA4 to, for example, MLA8 (e.g., simultaneously producing 8 receive beams or 8 multi-line acquisitions), entirely different dedicated CIC chips and CIC boards would be designed and customized for the MLA8 system. Hence, each CIC chip is customized to produce the receive beams needed from a particular matrix of input signals. As the number of receive beams increases, the internal circuitry of the CIC chip increases. With each increase in the number of receive beams to be produced, the number of duplicated circuits internal to the CIC chip increases, and the CIC chip becomes larger and larger.

Further, each newly designed CIC chip is masked in silicon which is an expensive nonrecurring engineering (NRE) cost. In the case of MLA8 or MLA16 (8 MLA beams or 16 MLA beams, correspondingly), the CIC chip may cost two to four times more than a CIC chip designed for MLA2 (2 MLA beams). Although lower tier MLA systems do not need and do not have the additional MLA capabilities of higher tier MLA systems, the lower tier MLA systems still bear a significant portion of the costs.

A seemingly obvious solution is to connect the analog-to-digital converter (ADC) output to multiple CICs. However conventional ADCs have a limited drive capability and most can not drive multiple CIC inputs. In addition, newer ADCs utilize source-synchronous LVDS (Low Voltage Differential Serial) Interfaces. These interface have a significant advantage with reduced I/O and power dissipation for the many ADCs and CICs. This leads to miniaturization with higher levels of integration, i.e. more channels per device. However this type of interface is inherently point-to-point. It typically can not drive multiple inputs without risk of data corruption.

A need exists for an improved beamformer architecture capable of being scalable between different MLA sizes using the latest, commercially available ADCs

BRIEF DESCRIPTION OF THE INVENTION

In one exemplary embodiment, a method for developing a beamformer for an ultrasound system is provided. The beamformer includes an RF interface configured to be connected to receiver boards that are connected to a probe. The method includes providing receiver boards, wherein each of the receiver boards is capable of conveying a common number of channels per board and has substantially similar circuit components and layouts. The method also includes selecting a number of channels per probe to be conveyed in parallel between a probe and the receiver boards, wherein the channels per probe is an integer multiple of the channels per board. The method further includes determining a combination of the receiver boards to use in the beamformer based on the number of channels per probe, wherein the receiver boards are capable of being used in at least first and second different combinations that support first and second different numbers of channels per probe.

In another exemplary embodiment, a beamformer for an ultrasound system is provided and includes an input for receiving ultrasound signals from a probe and an interface for communicating with an ultrasound processor. The beamformer also includes a receiver board interconnecting the input and the interface. The receiver board includes multiple ASICs connecting with one another, with the ASICs including data repeaters to convey the ultrasound signals received at the input between the ASICs.

In yet another embodiment, a method of performing beamforming in an ultrasound system is provided. The method includes obtaining ultrasound signals from a probe. The ultrasound signals have receive signals associated with channels of the probe. The method also includes configuring an array of ASICs to simultaneously process at least first and second subsets of the receive signals, with the first and second subsets being associated with first and second acquisition lines, respectively. The method further includes passing a portion of the receive signals obtained from the probe between at least two ASICs in substantially an unmodified repeating form.

DETAILED DESCRIPTION OF THE INVENTION

Figure 1:
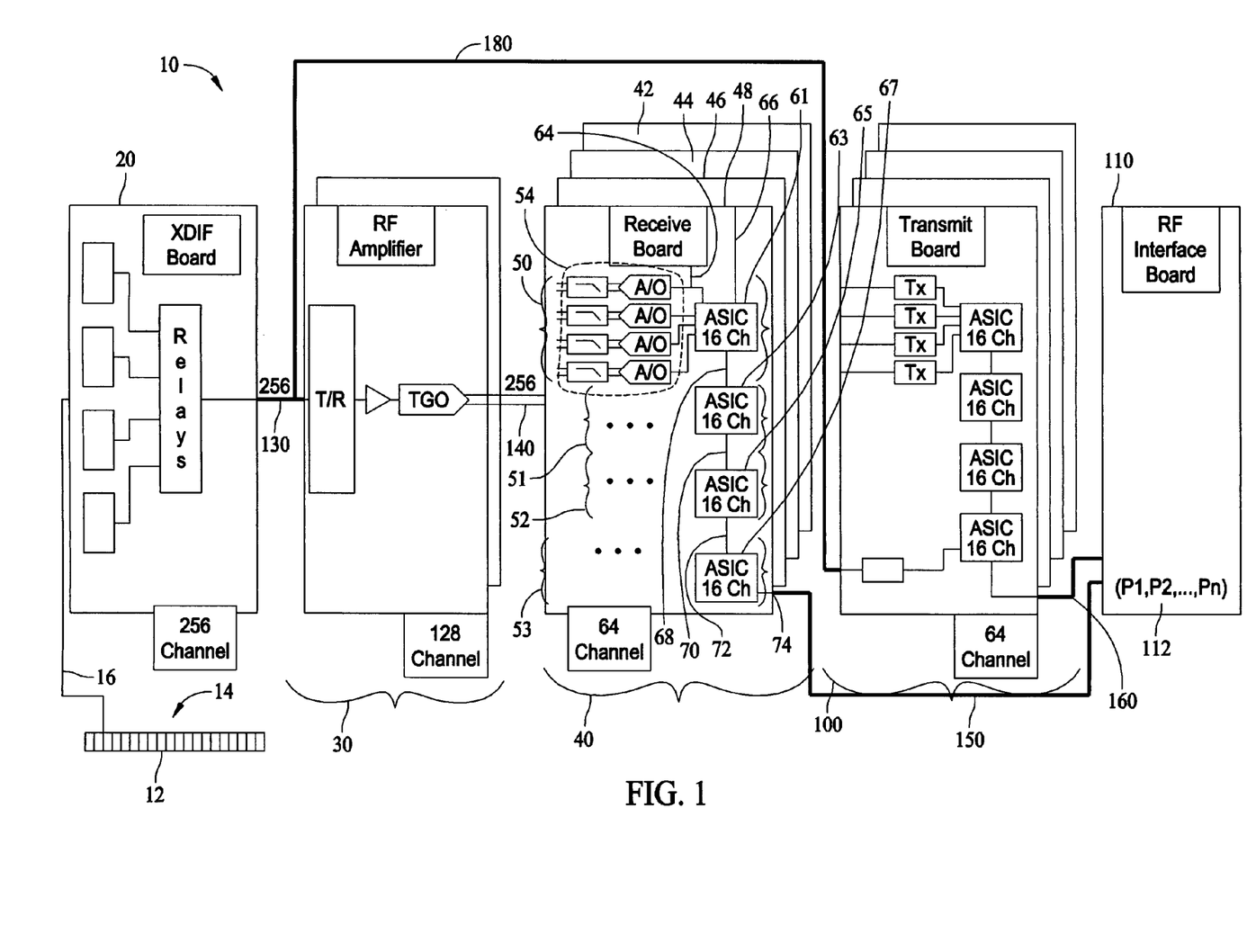
FIG. 1 is a block diagram of an ultrasound system formed in accordance with an embodiment of the present invention.

FIG. 1 is a schematic block diagram of a scalable ultrasound system 10 formed in accordance with an embodiment of the present invention. The ultrasound system 10 includes a transducer array 14 having transducer elements 12, transducer interface board 20, preamplifier boards 30, and receive boards group 40. Each of the receive boards are identified as receive board 42, receive board 44, receive board 46, and receive board 48. The ultrasound system 10 also includes transmit boards group 100, Radio Frequency Interface (RFI) board 110, and Doppler board 120. The receive boards group 40, the transmit boards group 100, and the RFI board 110 form the beamformer (BF).

Each of the receive boards in the receive boards group 40, shown in FIG. 1 as receive board 42, receive board 44, receive board 46, and receive board 48, has a similar scalable architecture, and thus only one receive board is described in detail, e.g. receive board 48. Receive board 48 is comprised of a plurality of Application Specific Integrated Circuit (ASIC) component groups, namely ASIC group 50, ASIC group 51, ASIC group 52, and ASIC group 53. Each of the ASIC component groups has a similar architecture, and thus only one ASIC group needs to be described in detail, e.g ASIC group 50. ASIC group 50 has an A/D converter group 54 and an ASIC 61, the A/D converter group 54 providing inputs 64 to ASIC 61. The inputs 64 of the ASIC 61 have a repeater function capability which enables the ASIC 61 to supply the inputs 64 of the A/D converter group 54 to another ASIC residing on a receive board (not shown in FIG. 1).

The flow of information and processing in FIG. 1 is described as follows. The RFI board 110 receives commands from a control processor (not shown in FIG. 1) regarding the formation of an ultrasound pulse to be emitted into a region of interest. The RFI board 110 creates transmit parameters from the received commands that determine a transmit beam of a certain shape and from a certain point or points at the surface of the transducer array 14. The transmit parameters are sent over connection 160 from the RFI board 110 to the transmit boards group 100. The transmit boards group 100 generate transmit signals from the received transmit parameters. The transmit signals are set at certain levels and are phased with respect to each other to steer and focus the transmit signals into one or more transmit pulses or firings.

The transmit boards group 100 send the transmit signals over connection 180 through the transducer interface board 20 to drive a plurality of transducer elements 12 within a transducer array 14. The connection 180 contains a number of individual channels or lines that may equal the number of transducer elements 12. The transmit signals excite the transducer elements 12 to emit ultrasound pulses. The ultrasound pulses are phased to form a focused beam along a desired scan line. Ultrasound echoes, which are backscattered ultrasound waves from tissue and blood samples within the scanned structure, arrive at the transducer elements 12 at different times depending on the distance into the tissue, from which they return and the angle, at which they contact the surface of the transducer array 14. The transducer array 14 is a two-way transducer and converts the backscattered waves (ultrasound echoes) of energy into received signals.

The received signals are conveyed in separate channels from the transducer array 14 over connection 16 to the transducer interface board 20, which relays the received signals over connection 130 to the preamplifier boards 30. The preamplifier boards 30 perform time gain compensation (TGC), a.k.a. swept gain, to increase the amplitude of received signals from increasing depths in the body to compensate for the progressive attenuation of the deeper echoes. The amplified received signals from the preamplifier boards 30 are passed over connection 140 to the receive boards group 40. In the illustrated example, connections 16, 130, and 140, each include 256 channels and the channels in the connection 140 are divided into four groups of 64 channels. Each of the receive boards in the receive boards group 40, e.g. receive board 48, receives a group of 64 channels from the preamplifier boards 30.

Figure 2:
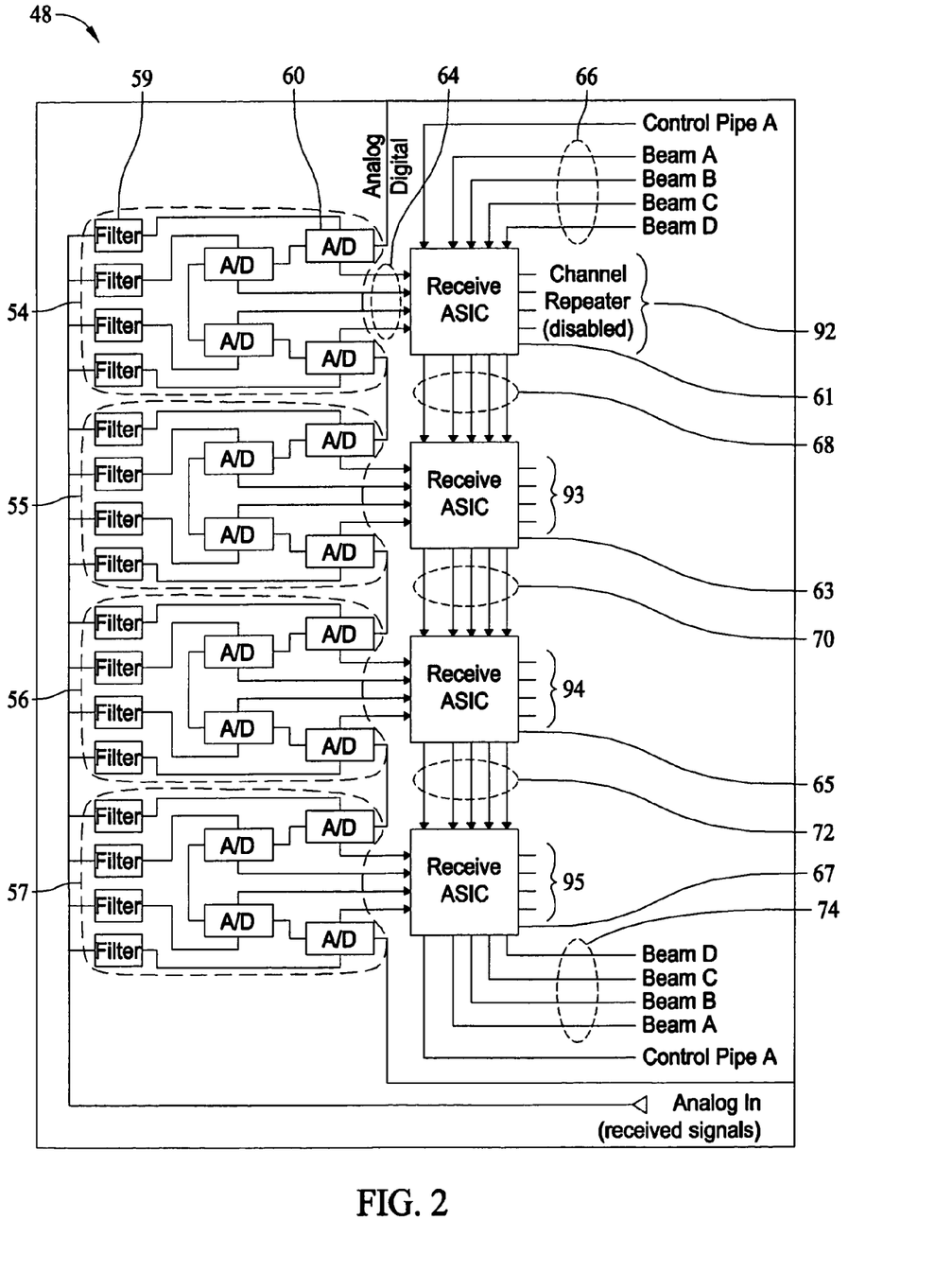
FIG. 2 is a block diagram of the beamformer receive board components in more detail.

FIG. 2 is an expanded view of receive board 48. The receive board 48 receives 64 channels that are divided into four groups of 16 channels. Each channel is formed as a low voltage differential pair which is joined to a corresponding filter and A/D converter, e.g. filter 59 and A/D converter 60. Each filter 59 filters the corresponding signal and each A/D converter 60 converts the filtered signal to a digital signal. Under the guidance of control instructions received from the control processor via the RFI board 110 (control processor and control signaling lines not shown in FIG. 1), the filtered, digitized input signals (e.g. inputs 64) are processed by an ASIC (e.g. ASIC 61). The processing may include performing time delaying and summation of processed received signals, potentially with summation of prior beam data (e.g. the beam data from bus 66), so as to construct a received beam from the echoes reflected from a given point within the subject's body. The beam data from ASIC 61 is passed along to a next entity, e.g. to the next ASIC 63 on the same receive board 48 or to an ASIC on the next receive board in the FIG. 1 receive boards group 40.

FIG. 1 shows four receive boards, 42, 44, 46, and 48, that are inter-connected such that beam data flows serially from receive board 42 to receive board 44 to receive board 46 to receive board 48. FIG. 2 shows that receive board 48 includes ASICs 61, 63, 65, 67 joined serially with one another, such as in a column direction. Each ASIC 61, 63, 65, and 67 receives 16 digitized receive signal inputs, e.g. inputs 64, from 4 Quad channel A/D converters, e.g. A/D converter group 54. The received signals at ASIC 61 are processed and summed with one another and potentially also summed with beam data arriving on bus 66 from a previous receive board 46. The resulting beam data is placed on bus 68. Bus 68 conveys the beam data, hereon also referred to as simply data, to ASIC 63. The beam data received on bus 68 by ASIC 63 may simply be passed, without further processing, onto bus 70 depending upon the source of the beam data. Each of ASICs 61, 63, 65 and 67 identify incoming beam data from the bus inputs of buses 66, 68, 70 and 72, respectively, e.g. beam data for beams A, B, C, and D. Depending upon the identified beam data, the beam data received on bus 68 by ASIC 63 will be further processed by ASIC 63 in connection with received signals provided directly to the ASIC 63 from A/D converter group 55. The ASIC 63 will then place the resulting data on bus 70 which is passed to ASIC 65. The ASIC 65 will either pass data incoming on bus 70 directly to bus 72 without further processing or process the data in connection with received signals provided directly to the ASIC 65 by A/D converter group 56. The ASIC 67 will either pass data incoming on bus 72 directly to bus 74 without further processing or process the data in connection with received signals provided directly to the ASIC 67 by A/D converter group 57. The beam data on bus 74 is then either passed to a next receive board of the receive boards group 40 (FIG. 1) or to high speed serial data bus (HSSDB) 150 [FIG. 1].

In FIG. 1, processed beam data is passed from receive board 42 to receive board 44, and then from receive board 44 to receive board 46, and then from receive board 46 to receive board 48. Receive board 48 delivers the resulting fully formed beam data sets for one or more completely constructed beams to the RFI board 110.

More than one beam may be constructed simultaneously at the receive boards group 40 of FIG. 1. The simultaneous collecting and processing of echo information along multiple scan lines within the subject is referred to as multi-line acquisition (MLA). The one or more fully formed beam data sets are passed from the receive boards group 40 over the high speed serial data bus (HSSDB) 150 to the RFI board 110.

The beam data sets received over the HSSDB 150 are demodulated at the RFI board 110 to create I/Q pairs of demodulated data values. The demodulated data is further processed on the RFI to provide image scan line data including, echo envelope data (B-mode), Color Doppler, and Spectral Doppler and B-Flow. The image scan line data is processed by scan conversion to perform a translation from scan sequence format to display format. The scan converted pixel data is then sent to display component architecture (not shown in FIG. 1) to convert the digital pixel data to analog data for display on a monitor.

The ultrasound system 10 has a scalable architecture in that the ultrasound system 10 may be expanded or upgraded on demand by adding ASICs to existing receive boards and/or adding receive boards. A system can be configured in the factory, late in the assembly process, to provide the number of channels and MLA for a specific model or customer order. The ASICs and receive boards already in the ultrasound system 10 do not require a re-design in order to expand or reduce the system and/or its capacity. Each receive board of the receive boards group 40 is comprised of substantially similar circuitry and components and layouts such that each receive board can be easily expanded or scaled upwards in capacity by adding similar components. An expanded board will still work properly with other system components or boards without requiring re-design, the components or boards being similarly scaled upwards as required by adding similar component modules. One possible scalable configuration is exhibited by the configuration of receive board 48 in FIG. 1.

In this configuration, each of the receive boards, 42, 44, 46, and 48, of the receive boards group 40 handles a common number of channels, in this example 64 channels per board. A channel supplies a single receive signal corresponding to one of the transducer elements 12 of the transducer array 14. Any number of receive boards similar to receive board 48 may be joined in a daisy chain or serial arrangement depending upon the number of channels to support. For example, two receive boards may be used each with 128 channels, or eight received boards may be used each with 512 channels, and the like.

Figure 3:
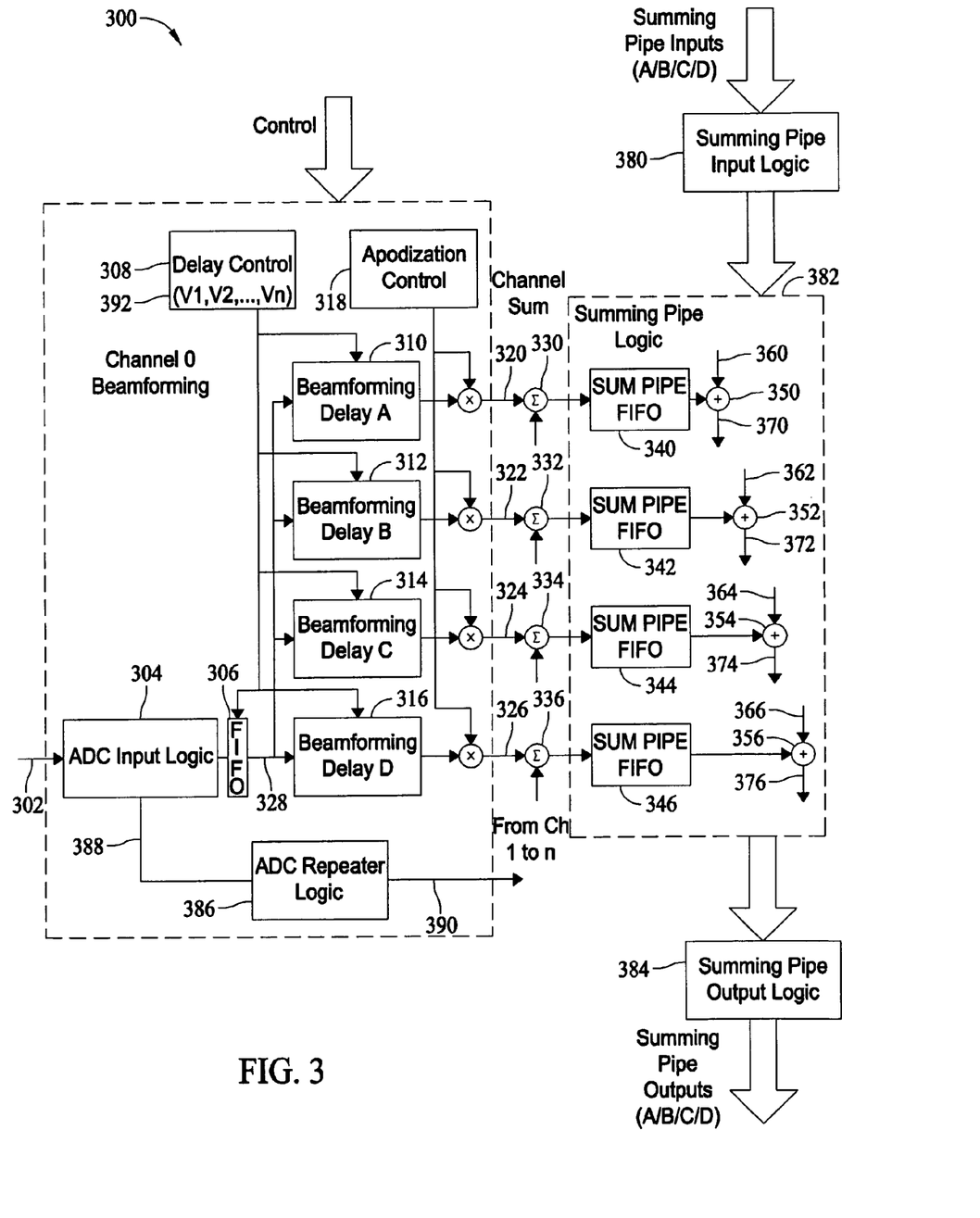
FIG. 3 is a block diagram illustrating circuitry within an ASIC that processes a receive channel input.

FIG. 3 illustrates an individual ASIC receive circuit block 300 for processing serial channel input 302. Each ASIC may include multiple ASIC receive circuit blocks 300. For example, ASIC 61 may have 16 ASIC receive circuit blocks 300 for processing 16 individual channel inputs. Each serial channel input may be received as a filtered, digitized serial stream of bits in the form of low voltage differential signaling (LVDS) at ADC input logic 304. For example, the channel input may be a series of 12 bits as opposed to clocking in 12 parallel inputs to 12 signal pins. Input logic 304 converts the serial channel input 302 into parallel outputs, which are interpolated (upsampled) and input to a FIFO buffer 306. Delay control 308 informs the FIFO buffer 306 of the predetermined delay to create the data for a beam. Examples of beams are partial beam A 320, partial beam B 322, partial beam C 324, and partial beam D 326. The FIFO buffer 306 receives input data from input logic 304 and produces, in this example, four times as much data. In this example, the FIFO buffer 306 may receive one value every 10 nanoseconds and produce four consecutive values every 10 nanoseconds for each of the four beamforming delays, beamforming delay A 310, beamforming delay B 312, beamforming delay C 314, and beamforming delay D 316. Each of the four beamforming delays, e.g. beamforming delay A 310, receives an input value from the FIFO buffer 306 over bus 328 in round robin fashion. The FIFO buffer 306 uses different delays to produce data for each of the four beamforming delays corresponding to four different beams (MLA4). Each of the four beamforming delays interpolate the input value received. An apodization calculation (from an apodization control 318) is applied to each of the interpolated values produced from the four beamforming delays 310, 312, 314, and 316 that results in corresponding outputs of partial beams A 320, B 322, C 324, and D 326. Each resulting partial beam output, e.g. partial beam A 320, may not be a complete beam, but only part of a complete beam. Often beams are formed using array apertures greater than 16 channels. In this case the beamformer sums the partially beamformed signal from multiple ASICs. In the example case of a 256 element aperture with MLA4, the beamformer sums the outputs from 16 receive ASICs, each providing partial sums of 16 channels.

Partial beam A 320 is summed by ASIC summation 330 with partial beam A output data from other similar circuit blocks 300 of the ASIC, resulting in a summed partial beam A that is stored in sum pipe FIFO 340. Likewise, ASIC summations 332, 334, and 336 produce summed partial beams for partial beams B 322, C 324, and D 326 that are correspondingly stored in sum pipe FIFOs 342, 344, and 346. Summing pipe input logic 380 may receive processed beam data in the form of serial input from a previous ASIC (possibly from an ASIC of a different board) and generate parallel outputs corresponding to accumulated beams A 360, B 362, C 364, and D 366 for use in a summing pipe logic 382. Adders 350, 352, 354, and 356 correspondingly add the accumulated beams A 360, B 362, C 364, and D 366 to the summed partial beams A, B, C, and D from corresponding FIFOs 340, 342, 344, and 346 to produce the corresponding accumulated beams 370, 372, 374, and 376. For example, adder 350 adds the accumulated beam A 360 to the summed partial beam A from FIFO 340 to produce the accumulated beam A 370. Likewise, adder 352 adds the accumulated beam B 362 to the summed partial beam B from FIFO 342 to produce the accumulated beam B 372, adder 354 adds the accumulated beam C 364 to the summed partial beam C from FIFO 344 to produce the accumulated beam C 374, and adder 356 adds the accumulated beam D 366 to the summed partial beam D from FIFO 346 to produce the accumulated beam D 376. Summing pipe output logic 384 receives the accumulated beams A 370, B 372, C 374, and D 376 and produces a serialized output of the accumulated beams for use by a next ASIC.

Translating the above for all receive ASICs, a summing pipe composed of the individual summing pipe logic of each ASIC (e.g. summing pipe logic 382) provides the summation of the 16 channel partial sums to provide a complete beam, e.g. Beam A. This summing pipe is composed of adders in each ASIC. The summing pipe logic of an ASIC adds the 16 channel partial sum with a summing input from the previous ASIC, and then outputs this new sum to the summing pipe input of the next ASIC in a column. A FIFO between the apodization circuit and summing pipe adder, e.g. summing pipe FIFO 340, aligns the partial sum with the summing pipe data. The summing pipe FIFO, e.g. FIFO 340, needs more delay to align partial data with summing pipe data in ASICs further along the summing pipe.

The serial summing pipe input to ASIC 61 is deserialized and passed as parallel data within the ASIC 61 from internal component to internal component (described within the description of FIG. 3). The resultant beam data from the ASIC 61 is again serialized for delivery to the next ASIC in the chain or column of ASICs of a receive board, or to the next ASIC on the next ASIC receive board in the chain of ASIC receive boards, or to the HSSDB.

ASIC 61 of FIG. 2 also has a repeater function or repeater capability, e.g. an ADC repeater logic 386 as shown in FIG. 3. To afford the repeater functionality, the deserialized channel output 388 of the ASIC receive circuit block 300 is tapped off and combined with likewise other deserialized channel outputs 388 from the receive circuit blocks 300 of the ASIC 61. The combination of deserialized channel outputs 388 are then serialized by the ADC repeater logic 386 to produce a serial output 390 (same as serial output 92 of FIG. 2) from the ASIC 61. In FIG. 2, channel repeater outputs 92 are identical to the inputs 64. The channel repeater outputs 92 are not further used, and are shown disabled, because channel repeater outputs 92 are not needed in producing the four MLA4 receive beams for the example of FIG. 2. However, FIG. 4 shows an MLA8 scaled up version of the receive board of FIG. 2 that utilizes the channel repeater outputs 92.

Figure 4:
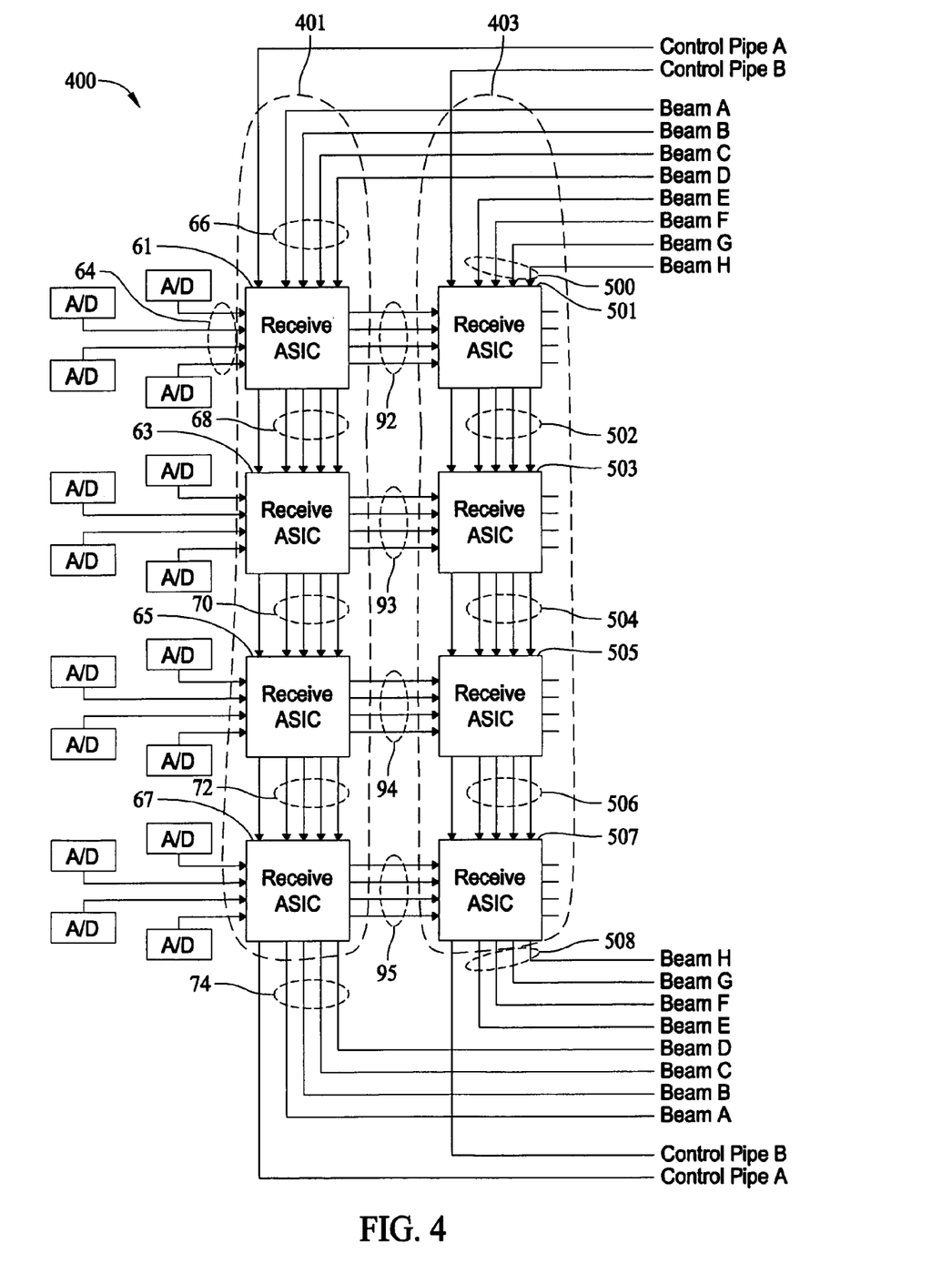
FIG. 4 illustrates an upgrade to the receive board shown in FIG. 2 when scaling up from an MLA4 arrangement to an MLA8 arrangement.

FIG. 4 shows a receive board 400 that has been scaled up from the capacity of receive board 48 of FIG. 2. The receive board 400 includes two columns 401 and 403 of ASICs 61, 63, 65, 67 and 501, 503, 505 and 507, respectively. The ASICs 501, 503, 505, and 507 each receive corresponding channel repeater outputs 92, 93, 94, and 95 from ASICs 61, 63, 65 and 67. The second column 403 of ASICs may receive signal inputs directly from an A/D converter group, e.g. inputs 64, or from a repeater, e.g. channel repeater outputs 92. The second column 403 of ASICs process receive signal inputs to produce beam data in addition to the beam data produced by the first column 401 of ASICs, ASICs 61, 63, 65, and 67. Thus, in the example of FIG. 4, the first column 401 performs beam processing for beams A, B, C, and D, and the second column 403 perform beam processing for beams E, F, G, and H. Alternatively, more columns, for example, two more columns may be added, giving a total of four columns of ASICs on the receive board, for an MLA16 configuration for processing 16 MLA beams.

In general, each column of ASICs functions similarly. An ASIC may receive filtered, digitized input signals from either the repeater of another ASIC or from an A/D converter group. An ASIC processes the needed beam data from the input signals, and potentially adds to the processed beam data. Beam data to potentially be added may be received from a previous ASIC in the column of ASICs or received from an ASIC of an ASIC column on a previous ASIC receive board. ASIC beam data is passed downwards in a column of ASICs from one ASIC to the next (a next ASIC possibly being in a column of ASICs on a next receive board). In the case of the last ASIC, the ASIC beam data is output onto the HSSDB 150.

In one embodiment, the output from a column 401 (FIG. 4) of ASICs of a receive board is passed over a backplane (not shown in the figures) to provide the input to a column on a next receive board. The last receive board is connected to the RFI board 110 via the HSSDB 150 (FIG. 1). The first receive board has inputs logically set to zero. In an alternative embodiment, each receive board contains another interface FPGA/ASIC (not shown in the figures) which converts the data streams into a high speed data bus (HSDB). The HSDB transports data from a receive board over a backplane and either to a next receive board where the HSDB data is summed in the summing pipe of the next receive board, or to the RFI board 110 via the HSSDB 150. Although a serial interface is preferred for the HSDB, a parallel interface could be used as well.

In the example of FIG. 4, ASIC 501 may receive beam data from bus 500 from a previous receive board. ASIC 503 receives beam data on bus 502 and outputs beam data on bus 504. ASIC 505 receives beam data on bus 504 and outputs beam data on bus 506. ASIC 507 receives beam data on bus 506 and outputs beam data on bus 508. Bus 508 may connect to a next receive board of ASICs or, in the case whereby beam processing is complete, may connect to the HSSDB 150 of FIG. 1.

Figure 5:
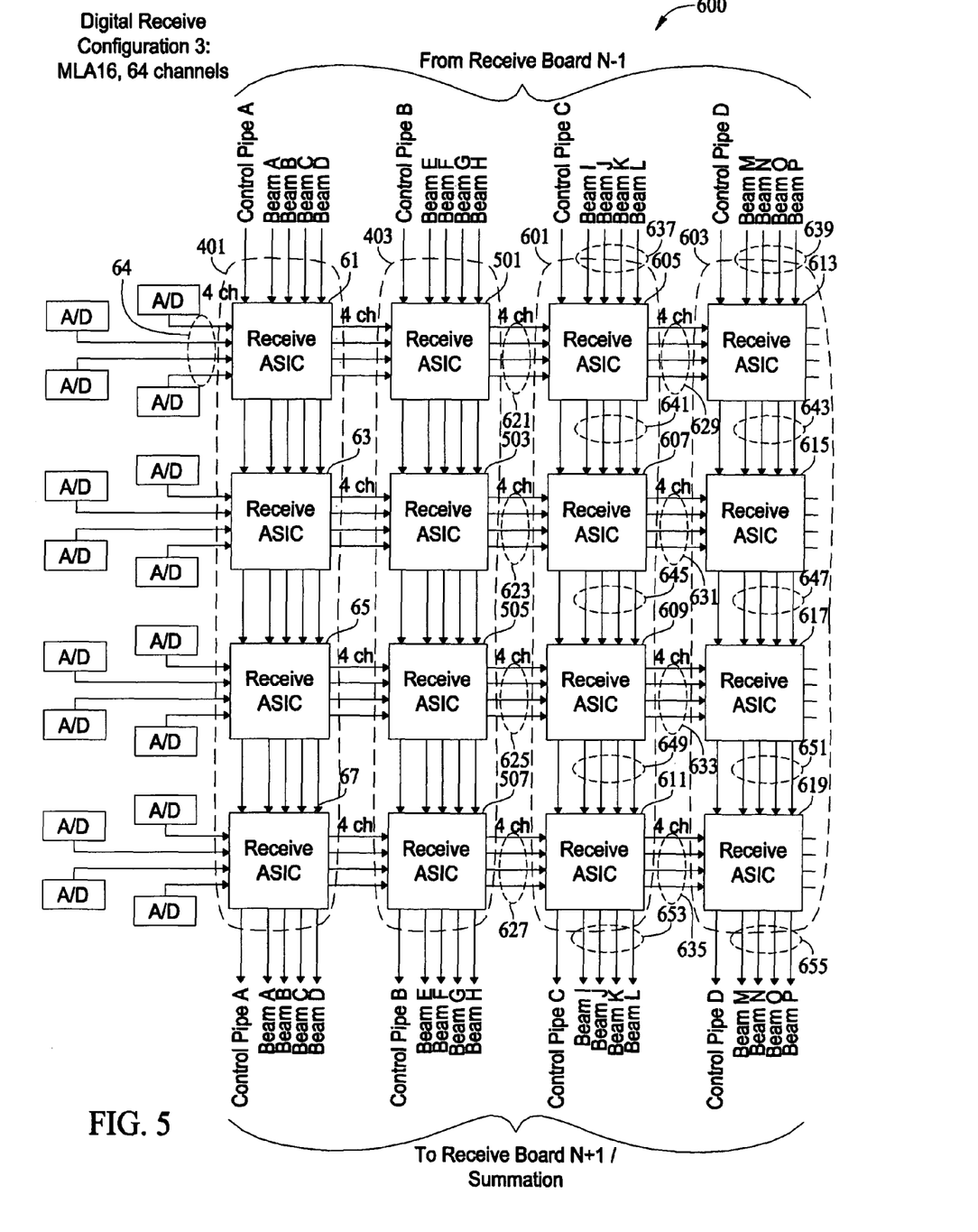
FIG. 5 illustrates yet another upgrade to the receive board shown in FIG. 2 when scaling up from an MLA4 arrangement to an MLA16 arrangement.

FIG. 5 shows a receive board 600 that has been scaled up from the capacity of receive board 48 of FIG. 2. The receive board 600 includes four columns 401, 403, 601 and 603 of ASICs 61, 63, 65, 67, ASICs 501, 503, 505, 507, ASICs 605, 607, 609, 611, and ASICs 613, 615, 617 and 619 respectively. The ASICs 605, 607, 609, and 611 each receive corresponding channel repeater outputs 621, 623, 625, and 627 from ASICs 501, 503, 505 and 507. The ASICs 613, 615, 617, and 619 each receive corresponding channel repeater outputs 629, 631, 633, and 635 from ASICs 605, 607, 609 and 611. The third column 601 of ASICs may receive signal inputs directly from an A/D converter group, e.g. inputs 64, or from a repeater, e.g. channel repeater outputs 621. The fourth column 603 of ASICs may receive signal inputs directly from an A/D converter group, e.g. inputs 64, or from a repeater, e.g. channel repeater outputs 629. The third column 601 of ASICs processes receive signal inputs to produce beam data in addition to the beam data produced by the first column 401 and second column 403 of ASICs. The fourth column 603 of ASICs processes receive signal inputs to produce beam data in addition to the beam data produced by the first column 401, second column 403, and third column 601 of ASICs. Thus, in the example of FIG. 5, the first column 401 performs beam processing for beams A, B, C, and D, the second column 403 performs beam processing for beams E, F, G, and H, the third column 601 performs beam processing for beams I, J, K, and L, and the fourth column 603 performs beam processing for beams M, N, O, and P.

In general, each column of ASICs functions similarly. An ASIC may receive filtered, digitized input signals from either the repeater of another ASIC or from an A/D converter group. An ASIC processes the needed beam data from the input signals, and potentially adds to the processed beam data. Beam data to potentially be added may be received from a previous ASIC in the column of ASICs or received from an ASIC of an ASIC column on a previous ASIC receive board. ASIC beam data is passed downwards in a column of ASICs from one ASIC to the next (a next ASIC possibly being in a column of ASICs on a next receive board). In the case of the last ASIC, the ASIC beam data is output onto the HSSDB.

In the example of FIG. 5, ASIC 605 may receive beam data from bus 637 from a previous receive board and ASIC 613 may receive beam data from bus 639 from a previous receive board. ASIC 607 receives beam data on bus 641 and outputs beam data on bus 645, and ASIC 615 receives beam data on bus 643 and outputs beam data on bus 647. ASIC 609 receives beam data on bus 645 and outputs beam data on bus 649, and ASIC 617 receives beam data on bus 647 and outputs beam data on bus 651. ASIC 611 receives beam data on bus 649 and outputs beam data on bus 653, and ASIC 619 receives beam data on bus 651 and outputs beam data on bus 655. Bus 653 and 655 may connect to next receive boards of ASICs or, in the case whereby beam processing is complete, may connect to the HSSDB 150 of FIG. 1.

Optionally, all of the MLA beams may not be processed in one ASIC. By not attempting to process all MLA beams for the system within one ASIC, the circuitry of the ASIC need not grow in size as the MLA size increases or is up scaled. Rather than increasing the ASIC circuitry (e.g. the summing pipe circuitry) to handle more MLA beams as the system is up scaled for a greater number of MLAs, the up scaled system may be obtained by adding more ASICs of substantially similar construction. The ASIC in this way serves as a modular component whereby the system MLA size may be increased by adding more ASICs, for example, by adding more columns of ASICs.

The ASIC is modular in that the ASIC need not be re-designed when up scaling the MLA number, but rather up scaling of the MLA number may be achieved by adding more of the same kind of ASIC to the receive boards. The receive board may also be made modular. Although the receive board of FIG. 2 shows only one column of ASICs, the board may be designed with empty sockets or space for a pad of the empty sockets.

When the number of MLA beams increases, a number of columns of ASICs may be added to the receive board to perform the processing for the increased number of MLA beams. For example, in FIG. 4, the first column of ASICs, ASICs 61, 63, 65, and 67, may process beams A, B, C, and D for an MLA4 system. Empty ASIC sockets or space for a pad of ASICs could be provided on the receive board for future growth. When the customer needs to up scale from an MLA4 system (see FIG. 2) to an MLA8 system (see FIG. 4), the second column of ASICs of FIG. 4, ASICs 501, 503, 505, and 507, may be added to the receive boards. In likewise manner, a receive board may be designed to hold four columns of ASICs, and when fully populated with four columns of ASICs, would be able to perform the processing for an MLA16 system wherein 16 MLA beams are processed. Thus, the receive board may be modular in that the receive board need not be re-designed when the MLA number for the system is increased.

As the number of MLA beams to be processed is increased, the amount of data being passed from the receive boards to the RFI board increases dramatically from one ultrasound pulse or firing to the next. A HSSDB, as exemplified by HSSDB 150 in FIG. 1, may be used to transport the large amounts of beam data collected between ultrasound pulses or firings. Without the use of a HSSDB, the time to transport the larger amount of beam data for higher MLA numbers could become significant enough to impact the framing rate, or time between pulses.

Optionally, control processor (not shown in FIG. 1) or the RFI board (or a board with similar functionality, hereon referred to as RFI or RFI board) may perform calculations on global parameters (the global parameters 112 as shown in FIG. 1) to obtain receive delay control values. Alternatively, the RFI board may broadcast the global parameters 112 over a high speed serial control bus (HSSCB) (not shown in FIG. 1) to all the ASICs of the receive boards group 40. The global parameters 112 provide a global or system level description of the focus trajectories for the receive beams. Each ASIC uses the received global parameters as input for a starting point to compute receive delay control values, as exemplified by the receive delay control values 392 in FIG. 3. The computed receive delay control values determine for every receive channel the delay values for every beam to be processed from the receive channel. By sending the global parameters, instead of the receive delay control values, from the RFI to the receive boards, a much lesser amount of control data may be transported from the RFI to the receive boards over the HSSCB. Lesser control data being transported may result in less time being needed between ultrasound pulses for setup of control information, and may result in more time being available for beam data processing.

Examples of global parameter information are the coordinates within a coordinate space, such as the starting focus point and the ending focus point, and the rate at which the focus point changes along the MLA line or focus trajectory. Examples of receive delay control values are the initial delay, the start delay, the delay rate of change, and the different delay inflection points. All the receive delay control values are at the transducer element level in that the receive delay control values would have to be calculated and passed down from the RFI to the receive ASICs for every transducer element or receive channel, if not being computed by the ASICs based on the global parameters information.

While the invention has been described in terms of various specific embodiments, those skilled in the art will recognize that the invention can be practiced with modification within the spirit and scope of the claims.

What is claimed is:

1. A beamformer for an ultrasound system, comprising:
an input for receiving ultrasound signals from a probe;
an interface for communicating with an ultrasound processor;
a receiver board interconnecting said input and said interface, said receiver board including multiple application specific integrated circuits (ASICs) connected with one another and arranged in first and second ASIC groups, said first ASIC group performing beamform processing on a first data subset of said received ultrasound signals and conveying a second data subset of said received ultrasound signals to said second ASIC group without beamform processing said second data subset said second ASIC group separately beamform processing said second data subset; and
a control processor configured to form control instructions that direct the first ASIC group to process said first data subset and to convey said second data subset to said second ASIC group without beamform processing said second data subset.

2. The beamformer of claim 1, wherein said ASICs are interconnected in a two dimensional array of rows and columns.

3. The beamformer of claim 1, wherein said ASICs in each of the first and second ASIC groups process said ultrasound signals and pass processed ultrasound signals between one another within the same first or second ASIC group.

4. The beamformer of claim 1, further compromising a plurality of said receiver boards connected in a daisy chain configuration to pass processed and unprocessed ultrasound signals therebetween.

5. The beamformer of claim 1, wherein said ASICs each include channel inputs configured to accept receive signals associated with individual transducer elements of said probe, said ASICs each including bus inputs configured to accept beam data from other ASICs.

6. The beamformer of claim 1, wherein at least one of said first and second ASIC groups processes said first or second data subset of said received ultrasound signals to produce beam data forming a portion of a beam data set that defines an acquisition line in an area of interest.

7. The beamformer of claim 1, wherein said first and second ASIC groups separately perform beamforming processing on said first and second data subsets, respectively, to produce first and second beam data sets that define first and second acquisition lines, respectively.

8. The beamformer of claim 1, wherein said ASICs in each of said first and second ASIC groups are joined by data buses that convey beam data between said ASICs in said first or second ASIC group, said ASICs processing said received ultrasound signals from said input to generate said beam data in a cascaded manner within each of the first and second ASIC groups.

9. The beamformer of claim 1, wherein said ASICs of said first ASIC group convey said second data subset to said second ASIC group with said ultrasound signals of said second data subset remaining substantially unchanged.

10. The beamformer of claim 1, wherein said ASICs in each of said first and second ASIC groups are joined by a bus conveying beam data between said ASICs in said first or second ASIC group, said ASICs modifying a portion of said beam data based on said received ultrasound signals for a predetermined acquisition line.

11. The beamformer of claim 1, wherein said ASICs perform beamform processing on said first and second data subsets by performing at least one of time delaying of said received ultrasound signals, summation of said received ultrasound signals, or summation of said received ultrasound signals with prior ultrasound signals.

12. The beamformer of claim 1, wherein said ASICs in said second ASIC group perform beamform processing on said second data subset, said first and second ASIC groups constructing first and second received beams, respectively, from ultrasound echoes reflected from one or more locations within an imaged body.

13. The beamformer of claim 1, further comprising a plurality of said receiver boards, each of said receiver boards including said first and second ASIC groups.

14. The beamformer of claim 13, wherein each of said first and second ASIC groups of a first receiver board performs beamform processing on a portion of said ultrasound signals before transmitting said portion to said first and second ASIC groups, respectively, of a second receiver board.

15. The beamformer of claim 1, where in said ASICs in said first ASIC group are connected in a cascade configuration and said ASICs in said second ASIC group are connected in a separate cascade configuration, wherein said ASICS in said cascade configurations perform beamforming processing on said received ultrasound signals before conveying said received ultrasound signals to another one of said ASICS in the same cascade configuration.

16. The beamformer of claim 1, wherein said first and second ASIC groups convey a third data subset of said ultrasound signals to a third ASIC group without performing beamform processing on said third data subset, said ASICs of said third ASIC group performing beamform processing on said third data subset.

17. The beamformer of claim 1, wherein said ASICs of said first ASIC group are coupled in series with each other and said ASICs of said second ASIC group are coupled in series with each other, said ASICs of said first ASIC group coupled in parallel with said ASICs of said second ASIC group.

18. A method of performing beamforming in an ultrasound system, said method comprising:
  receiving ultrasound signals from a probe;
  communicating said ultrasound signals to a receiver board including multiple application specific integrated circuits (ASICs) arranged in first and second ASIC groups;
  beamform processing a first data subset of said ultrasound signals with said ASICs of said first ASIC group;
  conveying a second data subset of said ultrasound signals to said ASICs of said second ASIC group without performing beamform processing on said second data subset; and
  beamform processing said second data subset with said ASICs of said second ASIC group.

19. The method of claim 18, wherein said conveying comprises repeating said second data subset without substantially changing said second data subset.

20. The method of claim 18, wherein said beamform processing of at least one of said first or second data subset comprises performing at least one of time delaying at least one of said first or second data subset, summation of at least one of said first or second data subset, or summation of at least one of said first or second data subset with prior ultrasound signals.

21. The method of claim 18, wherein said beamform processing said first data subset and said beamform processing said second data subset comprises constructing first and second received beams, respectively, from ultrasound echoes reflected from one or more locations within an imaged body.

22. The method of claim 18, further comprising conveying a third data subset of said ultrasound signals to said ASICs of a third ASIC group and beamform processing said third data subset with said ASICs of said third ASIC group.

23. The method of claim 22, wherein said conveying said third data subset comprises repeating said third data subset from said first ASIC group to said second ASIC group and from said second ASIC group to said third ASIC group without performing beamform processing on said third data subset.

* * * * *